No. 888,171. PATENTED MAY 19, 1908.
T. A. JONES.
PULLEY.
APPLICATION FILED MAR. 25, 1907.

Witnesses
Ray White.
Harry R. Leelite

Inventor
Thomas A. Jones
By Foree Bain and May
Attys

UNITED STATES PATENT OFFICE.

THOMAS A. JONES, OF CHICAGO, ILLINOIS.

PULLEY.

No. 888,171.　　　Specification of Letters Patent.　　　Patented May 19, 1908.

Application filed March 25, 1907. Serial No. 364,229.

*To all whom it may concern:*

Be it known that I, THOMAS A. JONES, a citizen of the United States, residing at Chicago, in the county of Cook and State of Illinois, have invented certain new and useful Improvements in Pulleys, of which the following is a specification.

My invention relates to improvements in pulleys, and more particularly to relatively large power pulleys provided with peripheral facings of material of relatively high frictional qualities.

One of the objects of my invention is to provide a pulley of the character described wherein the frictional facing of leather or other suitable material is adequately anchored and positioned against circumferential or lateral creeping or displacement, and against lateral enlargement.

Another object of my invention is to provide cheap and convenient means for effecting the anchorage of the friction surfacing material.

Figure 1:
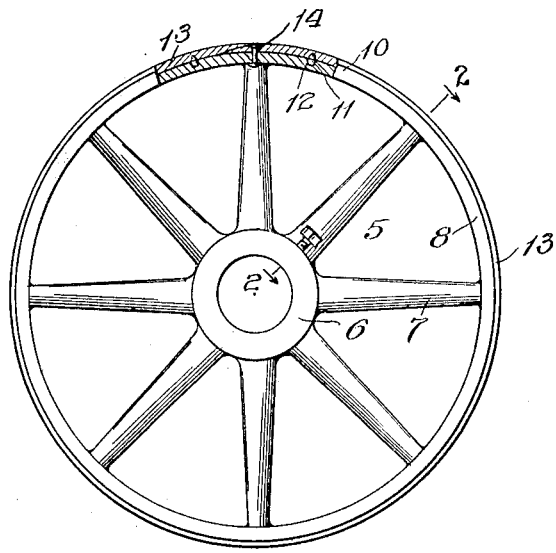
Figure 2:
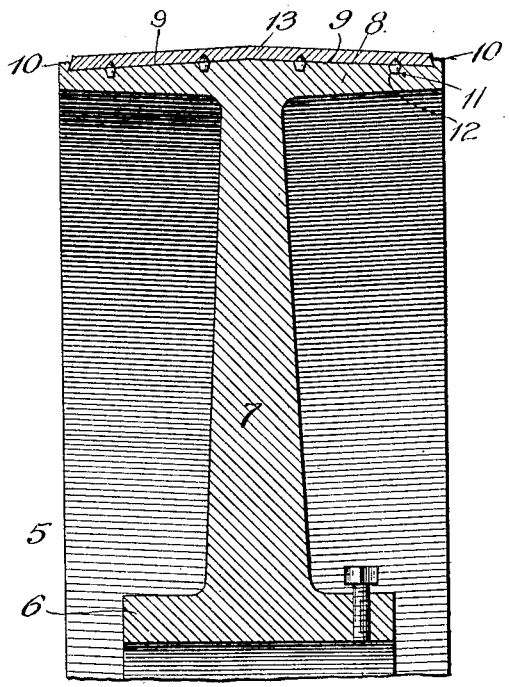

Other and further objects of my invention will become apparent to those skilled in the art from the following description, taken in conjunction with the accompanying drawing; wherein;

Figure 1 is a side elevation with fragments in section, of a pulley wheel constructed in accordance with my invention; and, Fig. 2 is a transverse section on line 2—2 of Fig. 1.

In the drawing, 5 indicates in general the frame of the pulley, comprising the usual hub 6, spokes 7, and rim 8. The peripheral surface of the rim is preferably crowned and uniformly channeled throughout its entire periphery, to provide a crown-bottomed recess 9, laterally bounded by projecting flanges 10 integral with the body, and making preferably undercut or acute angle joints with the surface 9 of the recess. In the peripheral surface of the recessed portion of the rim 8, at suitable intervals both transversely and circumferentially of the rim are provided inwardly tapering recesses 11, which are preferably arranged in transverse rows across the recessed portion of the rim and at equal intervals apart circumferentially thereof. In these recesses 11 are seated studs 12, having bases shaped corresponding with the recesses 11 and conical points of suitable elevation to project materially beyond the surface of the recessed portion of the rim, but to an extent less than the elevation of the flanges 10.

13 indicates the friction facing material, which is preferably leather, of such width and thickness as to completely fill the recess 9 and make intimate contact at its side edges with the flanges 10, such material being chamfered at its edges to fit the undercut surfaces of the flanges 10. Such surface material is preferably greater in thickness than the height of the flanges 10 to provide for wear of the leather, and to prevent the flanges from holding the belt off of the traction surface of the pulley, so that the peripheral surfaces of said flanges constitute no part of the driving peripheral surface of the pulley completed. The frictional surfacing material 13, when of leather, is preferably a single piece or band having its ends joined with the scarf joint in a manner well known in the art, and it is applied so tightly in that the point of the anchor members 12 are buried in the inner surface of the belt to hold the same. It may also be cemented to the metal face of the pulley. It will be observed that the surfacing material when thus applied is easy of application, as the application may start at one end of the strip and succeeding portions of the facing material pressed or hammered into place upon the contiguous anchor points, and when completely in place with its overlapping ends secured in the usual manner the frictional surfacing material is firmly held against peripheral creeping or movement at a large number of independent base points. When starting to place the friction material on the rim the slanting, scarfed end may be riveted to the rim of the pulley, as shown at 14, and the overlapping finishing scarfed end will overlie the holding rivets and hide them from view. Lateral enlargement, and movement or displacement of the surfacing material is also prevented by the flanges 10, the surfaces whereof presented for contact with the frictional body 13 being undercut, and well adapted to securely hold the frictional material against lateral displacement, thereby relieving the anchors 11 of lateral strain. While the anchors 11 may assist when necessary in taking up such lateral strain it will be apparent that on any given transverse line the number of anchor points tending to hold the material against lateral shifting are relatively few in comparison with the number of points which tend to hold any circumferential area of the belt against circumferential displacement. Therefore, I regard the provision of the side flanges as highly advantageous. Furthermore, it will be observed that the character of the anchoring devices is such as to not interfere with the removal of the friction surfacing material when such removal is deemed advisable, as obviously as soon as the joining ends of the surfacing band 13 are separated the band may be stripped off by pulling it radially outward from the points of anchorage. I have found furthermore that this construction may be very cheaply made, as it is not essential that the anchoring members 12 be shaped or fitted with any degree of nicety, which would require especially painstaking work, for it will be noted that the anchor points are entirely confined on all sides by coacting rim and surface members of the pulley, so that they cannot readily work loose or become unseated.

The under cutting of the side flanges and the corresponding chamfering of the edges of the frictional material is highly advantageous, as this means prevents the marginal edges of the frictional material from raising from the face of the pulley and produces a finished smooth product.

Having thus described my invention, what I claim and desire to secure by Letters Patent, of the United States, is:

In a pulley of the character described, an integral rim having in its periphery a continuous recess bounded by flanges integral with the rim having their proximate surfaces undercut, said rim being provided with a plurality of tapering recesses suitably spaced apart throughout its lateral and peripheral extent, a stud seated in each recess having a tapering base and a conical point projecting beyond the surface of the bottom of the recess a distance less than the depth of the recess, and a yielding frictional surfacing member fitting snugly in said recess in intimate contact with bottom and sides with the corresponding surfaces of the recess, and having embedded therein the points of the studs, said surfacing material being thicker than the height of the flanges bounding the recess.

In testimony whereof I hereunto set my hand in the presence of two witnesses.

THOMAS A. JONES.

In the presence of—
  GEORGE T. MAY, Jr.,
  MARY F. ALLEN.